June 4, 1929.  C. F. SCHLEHER  1,716,355
REGULATING VALVE FOR REFRIGERATING MACHINES
Filed March 3, 1927   3 Sheets-Sheet 2
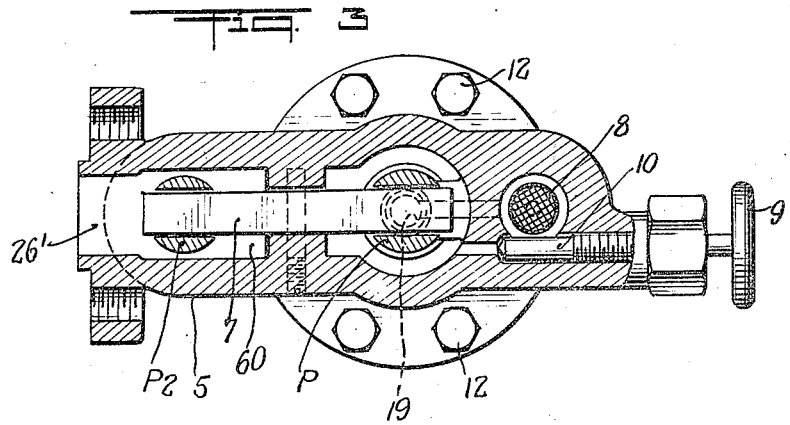
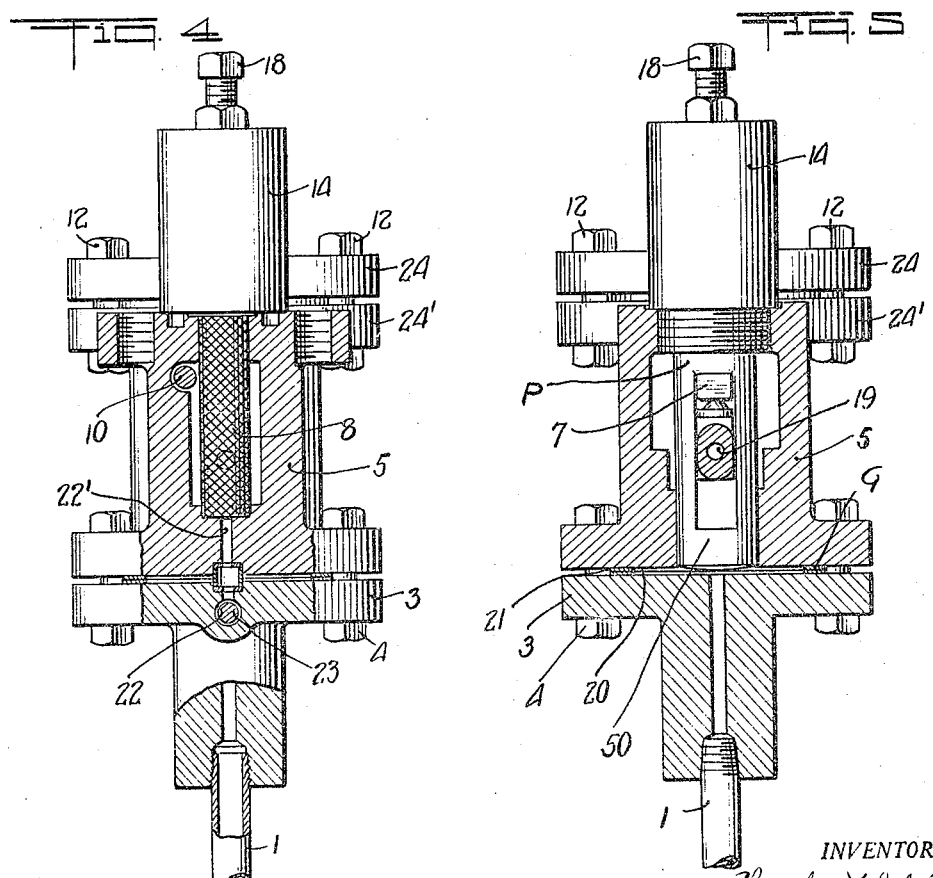
INVENTOR.
Charles F. Schleher
BY Mock & Blum
ATTORNEYS.

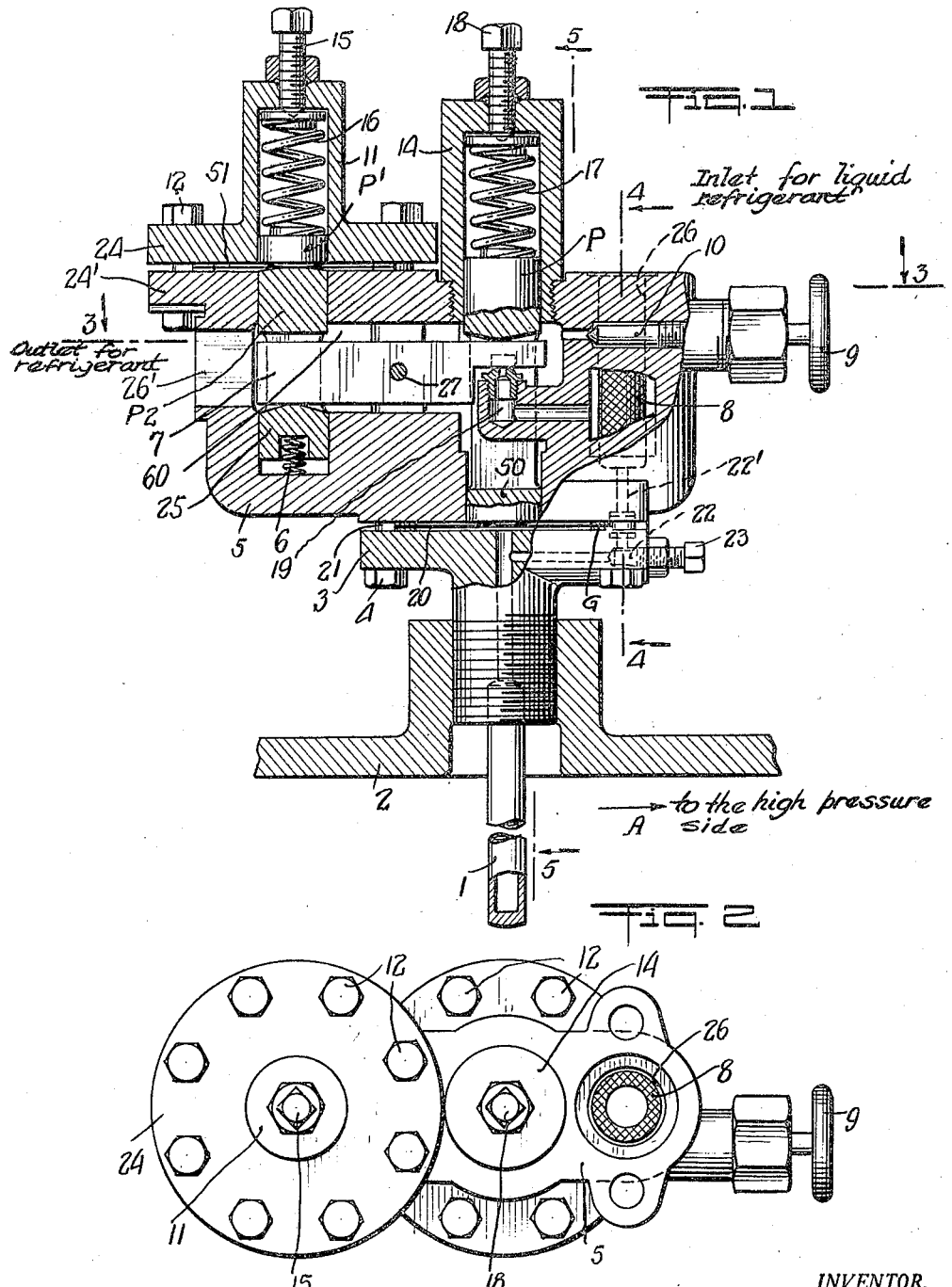

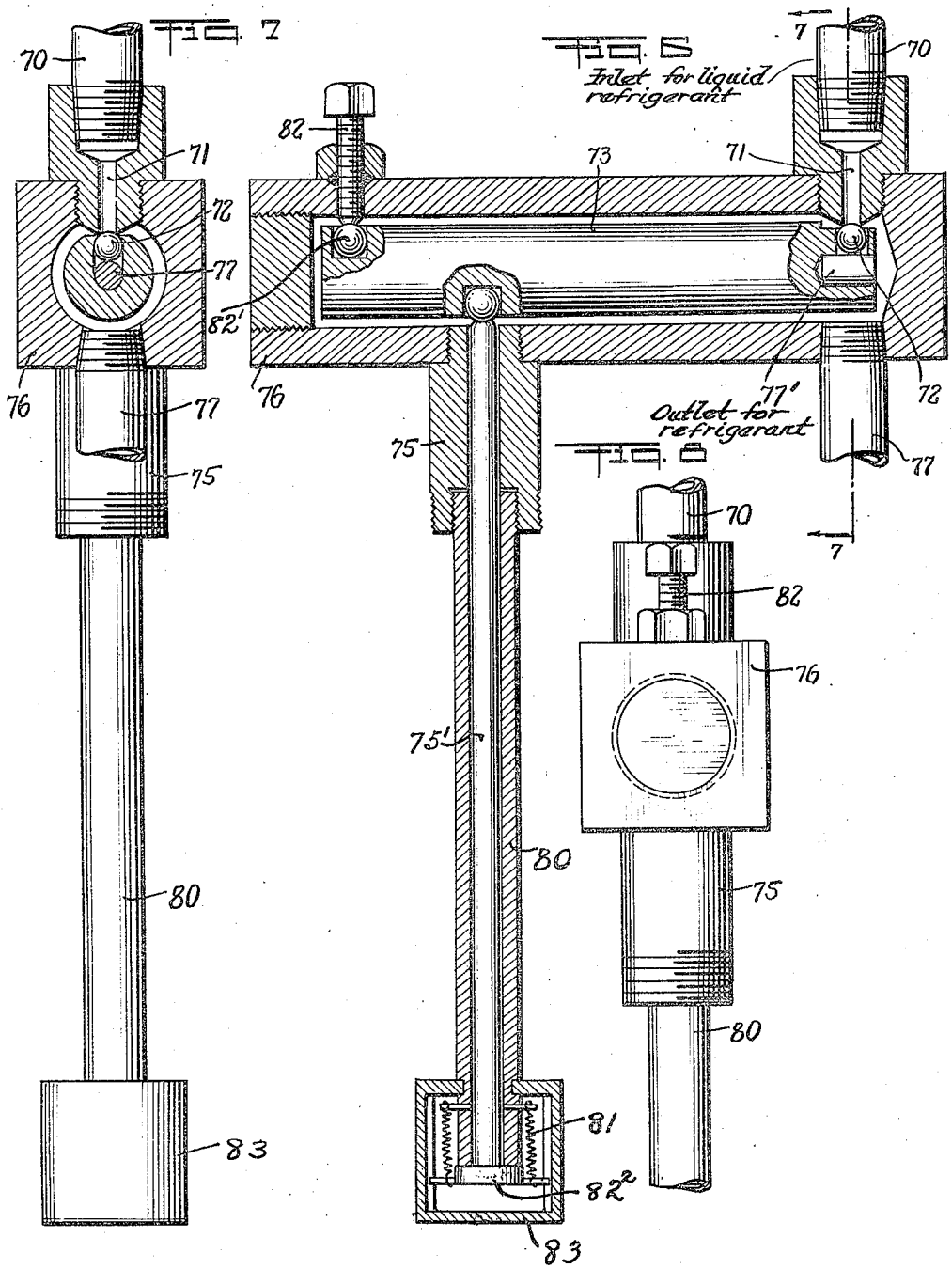

Patented June 4, 1929.

1,716,355

UNITED STATES PATENT OFFICE.

CHARLES F. SCHLEHER, OF BROOKLYN, NEW YORK.

REGULATING VALVE FOR REFRIGERATING MACHINES.

Application filed March 3, 1927. Serial No. 172,221.

My invention relates to a new and improved form of regulating valve for refrigerating machines.

One of the objects of my invention is to devise a new and improved form of regulating valve which shall have a combined thermostatic and pressure control for regulating the amount of refrigerating fluid, such as ammonia or any other gas which is supplied to a refrigerating machine of any standard type.

Another object of my invention is to provide a regulating valve which shall be of extremely simple and durable construction.

Another object of my invention is to provide a regulating valve which shall automatically operate to admit the necessary amount of refrigerating fluid into a machine to enable it to operate at maximum efficiency and which will automatically operate in a simple and reliable manner to prevent the entrance into or escape from the said refrigerating machine of the refrigerating fluid, when the operation of the machine is temporarily stopped.

Other objects of my invention will be set forth in the following description and drawings which illustrate preferred embodiments thereof, it being understood that the above general statement of the objects of my invention is intended merely to generally explain the same and not to limit it in any manner.

Fig. 1 is a sectional view illustrating one embodiment of my invention.

Fig. 2 is a top view of the device shown in Fig. 1.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a sectional view showing a second embodiment of my invention.

Fig. 7 is a sectional view on the line 7—7 of Fig. 6.

Fig. 8 is an elevation of the device shown in Figs. 6 and 7.

In a refrigerating machine of any standard type which employs a refrigerating fluid, this fluid passes through the well known cycle of operations, being compressed at one point and having the heat of compression absorbed therefrom, and being allowed to expand at another point in a refrigerating coil or any suitable medium. The first stage is commonly called the high pressure side of the machine and the second stage is called the low pressure side of the machine. In order to have the machine operate at maximum efficiency, it is necessary that the amount of refrigerating fluid in the machine should have a certain ratio to the capacity of the machine. This point of maximum efficiency is reached when the gas which is passing to the high pressure side or stage of the machine has a temperature which is substantially the liquefaction temperature, and none of the gas passes to the high pressure stage save in the gaseous or vaporous condition. If there is too much refrigerating fluid in the machine, some of this passes through the cooling or low pressure side of the machine in either the liquid condition or in an incompletely vaporized condition, which, of course, lowers the efficiency of the machine. If there is too little refrigerating fluid in the machine, then this reaches the high pressure side of the machine at a temperature which is above the correct temperature.

The improved regulating valve made according to my invention operates as follows:—

The liquid gas enters the valve casing 5 by means of the inlet 26 which is connected to any suitable reservoir for the liquid refrigerant, this reservoir being not shown in the drawings as in itself this is old and well known. The liquid refrigerant (ammonia or the like) passes through the screen 8 which is made of any suitable mesh and prevents dirt, scale or the like from passing through. The liquid refrigerant then passes into the nozzle 19, the mouth of which is controlled by the valve end of a lever 7 which is pivoted at 27. A plunger P is operated upon by a compression spring 17, the compression of which is regulated by means of the screw 18 which cooperates with the outer end of the casing 14 in which the plunger P is slidably mounted. The plunger P is continued below the nozzle 19 and its lower end 50 abuts a diaphragm 20 which is mounted in a peripheral member 21, a fluid-tight connection being made by suitable gaskets G, such as are shown in Fig. 5. Hence, the nozzle 19 and the valve lever 7 in effect project through an opening in the plunger P. The diaphragm 20 closes the top of a tube 1 which is preferably filled with the same refrigerating fluid (in gaseous form) which is charged into the valve through the inlet 26. The opening of the nozzle 19 is regulated so as to permit the proper amount of refrigerant to enter the low pressure side of the machine. The liquid refrigerant passes out of the opening 26' to the low pressure side of the machine, which is not illustrated, as my invention is directed to the regulating valve per se. The refrigerant is allowed to expand in the well known manner and the vaporized refrigerant is then passed to the high pressure side of the machine through the pipe 2 in the direction indicated by the arrow A to the compressor of the machine. Hence, when the refrigerating fluid sweeps over the thermostat tube 1, it heats the fluid therein to the temperature at which the gas is returned to the compressor of the machine. Hence, the temperature and therefore the pressure of the gas in the thermostat tube 1 correspond to the temperature of the vaporized refrigerating fluid. Since the pressure below the diaphragm 20 is therefore normally greater than the pressure of the liquefied refrigerant above the diaphragm 20, it is the function of the compression spring 17 to substantially equalize the pressure above and below the diaphragm 20 so that the plunger P operates to close the mouth of the nozzle 19 save when there is an insufficient supply of the refrigerating fluid in the machine. If the supply of the fluid is insufficient, this causes a rise in the temperature of the gas passing through the pipe 2, so that the diaphragm 20 is bent upwardly very slightly to raise the plunger P. When the machine is being operated and a sufficiently large amount of refrigerant has entered the low pressure side, the spring 17 and the plunger P operate to close the mouth of the nozzle 19. Hence, the device operates to automatically admit the proper amount of refrigerating fluid to the low pressure side of the machine.

When the operation of the machine is temporarily stopped, the gas in the thermostat tube 1 would tend to raise the plunger P, thereby retaining the nozzle 19 in the open condition. The gas in the valve normally acts upon an upper diaphragm 51, as the fit of the plunger P² is sufficiently loose to enable the gas to ascend to the underside of the diaphragm 51. One or more small holes could be bored in the flange 24' of the casing 5, if desired, for this purpose. The upper side of the diaphragm 51 (which is also provided with suitable peripheral gaskets) is acted upon by means of the plunger P' which is associated with the compression spring 16, whose force can be regulated by means of the screw 15 which co-operates with the outer end of the casing 11. The plunger P' may consist of an ordinary washer to transmit the force of the spring 16. The outer end of the valve lever 7 projects through an opening in the plunger P², and the bottom 25 of this plunger is acted upon by means of a compression spring 6. The force of the spring 16 is normally greater than that of the compression spring 6, so that the plunger or washer P' tends to downwardly flex the diaphragm 51, thus forcing the plunger P² downwardly and permitting the lever 7 to have a limited turning movement in the counter-clockwise direction. However, when the operation of the machine is temporarily stopped, the pressure of the refrigerating fluid upon the underside of the diaphragm 51 is increased, so that the compression spring 6 is free to move the plunger P² upwardly and thus close the mouth of the nozzle 19.

In order to charge the tube 1 with the refrigerating fluid, a conduit 22' is provided which is normally closed by a needle valve 22 controlled by a head 23. By temporarily opening the needle valve 22, the thermostat tube 1 can be charged with the ammonia or other refrigerant and when the thermostat tube 1 is full of such refrigerant, the needle valve 22 is tightly closed.

The lower diaphragm 20 is clamped against the casing 5 by means of a member 3 which is held in position by bolts 4. Likewise, the upper diaphragm 51 is clamped in position by means of a member 24 which is clamped against the extension 24' of the casing by means of bolts 12.

The device is provided with an ordinary by-pass valve 10 controlled by the hand-wheel 9 by means of which the refrigerant can be caused to flow to the machine in a path other than through the valve or directly through the passage 60 and without passing through the nozzle 19.

The face of the diaphragm 20 which abuts the lower end of the plunger P may be designated as the outer face of the diaphragm. This outer face is subjected only to the gas pressure which prevails within the valve. Likewise, the diaphragm 20 can move outwardly when actuated by the gas pressure in the tube 1 without encountering any resistance save the resistance of the spring 17. It is not necessary for the diaphragm 20 to actuate any other diaphragm which is subjected to atmospheric pressure, when the diaphragm 20 is outwardly actuated. That is, the plunger P can be freely actuated in its short path of movement without encountering the resistance of atmospheric pressure. This increases the sensitiveness of the device. It is also noted that the thermostat 1 is subjected to the temperature of the vaporized refrigerant, while said refrigerant is moving from the low pressure side of the machine.

In order to provide a simpler and cheaper type of valve and one which is more practical for utilizing carbon dioxide as a refrigerant, the embodiment shown in Figs. 6–8 is preferable. In this embodiment the liquid refrigerant enters through the pipe 70, which can be provided with any suitable strainer, and passes through a nozzle 71 controlled by means of a ball valve 72. The ball valve 72 is mounted at the end of a lever 73 whose lefthand end is provided with a pivot point by means of the screw 82. The bottom of the screw 82 has an arcuate end which abuts a ball 82' which fits in a suitable recess of the lever 73 with a slight lateral play. This permits the lever 73 to freely turn. The ball valve 72 is mounted in a recess which has a slightly greater diameter, so that the said ball valve 72 has a slight lateral play which makes it self-centering. The end of the nozzle 71 has a contour corresponding to that of the ball valve 72. The recess in the right-hand end of the lever 73 is closed by a cylindrical pin 77' upon which the ball valve 72 can rest. This cylindrical pin 77' can be replaced by another ball of the same size or a slightly greater size than the ball 72. The lever 73 can be urged in the counterclockwise direction by means of the rod 75' which fits within the expansion cylinder 80. The rod 75' can be made of a low carbon tool steel and the expansion cylinder 80 can be made of brass or any other metal which has a higher co-efficient of expansion than the inner rod 75'. The bottom of the expansion tube 80 is provided with a washer $82^2$ which is held in position by means of a spring 81 so as to permit the relative downward movement of the rod 75' in case of abnormal conditions. While the expansion tube 80 could be subjected to various thermostatic conditions, I prefer to subject it to the action of the refrigerating fluid after it has passed through the compressor and before the heat is abstracted from the refrigerating fluid. Hence, the temperature of the tube 80 is the highest temperature within the machine, while the machine is operating.

When the machine is set into operation, the hot gas passing out of the compressor heats the tube 80 until it expands sufficiently to cause the valve 72 to open, so that the liquid refrigerant from the storage tank in the high pressure side passes into nozzle 77. The temperature of the gas passing out of the compressor necessarily depends on the temperature of the gas supplied to the compressor, so that the expansion of tube 80 is regulated by the efficiency of the low pressure side. Hence, the valve 72 is opened to an extent to permit the machine to operate at maximum efficiency. The device also operates as an automatic shut-off valve when the machine is stopped and the tube 80 contracts because its temperature has been lowered to atmospheric temperature.

The liquid refrigerant passes out of the casing 76 through the pipe 77.

A cap 83 can be used to enclose the lower part of the expansion cylinder 80, which is mounted in a bushing 75 connected to the casing 76. The rod 75' abuts a ball similar to the balls 72 and 82'.

It will be noted that the upper face of the washer $82^2$ abuts the bottom of the expansion cylinder 80. Hence, the spring 81 can be sufficiently compressed to hold the said washer in position, but the said washer can move downwardly for a very short distance so as to permit the parts to yield under abnormal working conditions. The washer $82^2$ is guided in cap 83.

The balls 72 and 82' can be made of any desired size.

In the embodiment shown in Fig. 6, if the machine is temporarily out of operation, so that the temperature of the thermostat element 80 is the same as the atmospheric temperature, the rod 75' is urged to a position in which the ball valve 72 closes the mouth of the nozzle 71.

Of course, the respective movements of the levers 7 and 73 are very small. For example, in the embodiment shown in Fig. 6, the ball valve 72 is only moved a few thousandths of an inch when it is actuated to the open position.

I have shown two preferred embodiments of my invention, but it is clear that numerous changes and omissions could be made without departing from its spirit.

I claim:—

1. In a regulating valve for a refrigerating machine, a nozzle through which the refrigerant is adapted to pass to the low pressure side of the machine, a movable valve adapted to close the mouth of the said nozzle, a thermostat adapted to actuate said valve to the opening position when the temperature thereof is sufficiently high, the said thermostat being exposed to the temperature of the refrigerant when the refrigerant is in non-liquid condition, and additional means controlled by the gas pressure within the device and adapted to urge the said valve to the closing position, said additional means being movable within said valve independently of said thermostat.

2. In a regulating valve for a refrigerating machine, a nozzle through which the refrigerant is adapted to pass to the low pressure side of the machine, a pivoted member located within the said regulating valve and having one end thereof adapted to close the mouth of said nozzle, a spring actuated member abutting the said end of the pivoted member and adapted to actuate it to the closing position, a thermostat adapted to actuate the said spring plunger away from the said pivoted member, the said thermostat being exposed to the temperature of the refrigerant when it is in the non-liquid condition, a second spring pressed member adapted to actuate the said pivoted member to the closing position, a third spring pressed member adapted to oppose the movement of the second mentioned spring pressed member, and a pressure responsive diaphragm located intermediate the scond and the third spring pressed members and adapted to urge the third spring pressed member away from the second spring pressed member when the gas pressure within the device exceeds a predetermined limit, so that the second spring pressed member is free to move the said pivoted member to the closing position.

3. A regulating valve for a refrigerating machine having a casing, said casing having an inlet to permit the entrance of the refrigerant, a tube associated with said casing and containing the refrigerant in gaseous form, a diaphragm associated with the mouth of said tube and responsive to the pressure which is within the said tube, a nozzle located within the casing and through which the refrigerant is adapted to pass, a pivoted valve member located within the said casing and having one end thereof adjacent the mouth of the said nozzle and adapted to close the same, a spring pressed member having an opening therein through which the said nozzle and the adjacent end of the pivoted valve member extend, the lower end of the said spring pressed member abutting the said diaphragm, another portion of said spring pressed member abutting the said pivoted member to urge it into the closing position, a second spring pressed member adapted to urge the said pivoted member into the valve closing position, the pivot of said pivoted member being intermediate the first spring pressed member and the second spring pressed member, a second pressure responsive diaphragm located within the said casing and abutting the end of the second spring pressed member, and a third spring pressed member located on the other side of the second pressure responsive diaphragm and adapted to oppose the movement of the second spring pressed member.

4. A regulating valve for a refrigerating machine comprising a nozzle through which the refrigerant passes, a valve associated with said nozzle, temperature-responsive means adapted to open said valve, and pressure-responsive means adapted to close said valve, said temperature-responsive means being movable within said valve independently of said pressure-responsive means.

In testimony whereof I affix my signature.

CHARLES F. SCHLEHER.